(12) United States Patent
Zagranski et al.

(10) Patent No.: US 6,873,887 B2
(45) Date of Patent: Mar. 29, 2005

(54) ROTOR TORQUE ANTICIPATOR

(75) Inventors: Raymond D. Zagranski, Somers, CT (US); Robert D. Niebanck, Milford, CT (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 0 days.

(21) Appl. No.: 10/292,045

(22) Filed: Nov. 12, 2002

(65) Prior Publication Data

US 2003/0135305 A1 Jul. 17, 2003

Related U.S. Application Data

(60) Provisional application No. 60/343,649, filed on Nov. 13, 2001.

(51) Int. Cl.[7] .................... B64C 27/57; B64C 27/28; G06F 15/16
(52) U.S. Cl. .................... 701/3; 701/4; 244/6
(58) Field of Search .............. 701/3, 4, 100, 701/110; 244/6, 60, 17.13; 416/27, 43, 30, 33; 60/39.281, 39.15

(56) References Cited

U.S. PATENT DOCUMENTS

| | | | |
|---|---|---|---|
| 3,963,372 A | * 6/1976 | McLain et al. | 416/30 |
| 4,466,526 A | 8/1984 | Howlett et al. | 477/113 |
| 4,470,118 A | * 9/1984 | Morrison | 701/100 |
| 4,564,908 A | 1/1986 | Clelford et al. | |
| 4,648,797 A | * 3/1987 | Martin | 416/27 |
| 4,807,129 A | * 2/1989 | Perks | 701/3 |
| 5,188,511 A | 2/1993 | Ebert | |
| 5,265,825 A | 11/1993 | Ebert et al. | |
| 5,274,558 A | * 12/1993 | High et al. | 701/100 |
| 5,850,615 A | * 12/1998 | Osder | 701/4 |
| 6,467,726 B1 | * 10/2002 | Hosoda | 244/60 |

FOREIGN PATENT DOCUMENTS

WO    WO 93/04418 B1    3/1993

OTHER PUBLICATIONS

European Search Report dated Oct. 15, 2004.

* cited by examiner

Primary Examiner—Tan Q. Nguyen
Assistant Examiner—Dalena Tran
(74) Attorney, Agent, or Firm—David J. Silvia; Edwards & Engell, LLP (57) ABSTRACT

A system for performing feed-forward anticipation of rotor torque demand on a helicopter engine is disclosed which includes a flight control computer adapted and configured to predict the total torque required at the main and tail rotors of the helicopter, and an engine fuel control system adapted and configured to compute the rate of change of the total torque, convert the rate of change of the total torque to an engine acceleration/deceleration rate, and obtain a demanded engine acceleration/deceleration rate therefrom.

15 Claims, 6 Drawing Sheets

2s Collective Pull From 80 Knots
Powered Descent to 25 ft/s Climb

Figure 3

2s Collective Pull From 10% Split
Needle Autorotation to Level Flight

Figure 4

120 Knots Terrain Avoidance
Pulls to 1.5 "g", Pushover to 0 "g"

Figure 5

ROTOR TORQUE ANTICIPATOR

CROSS-REFERENCE TO RELATED APPLICATIONS

The subject application claims the benefit of priority from U.S. Provisional Patent Application Ser. No. 60/343,649 filed Nov. 13, 2001, the disclosure of which is herein incorporated by reference in its entirety.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject disclosure relates to control systems for helicopters, and more particularly, to a rotor load anticipator that utilizes the total torque at the rotor blades to predict demand.

2. Background of the Related Art

To improve engine power management and aid in rotor speed control, modern helicopter engine control systems such as Full Authority Digital Engine Control (FADEC) systems utilize complex algorithms to anticipate a change in power demand. These anticipation algorithms utilize a number of pilot and airframe inputs including collective stick rate, yaw control rate, lateral stick rate and rotor speed rate to predict torque requirements. This feed-forward anticipation approach controls fuel flow to accelerate or decelerate the engine, thereby preventing rotor droop or an over-speed condition from occurring as a result of sudden torque inputs imposed on the rotor blades.

There is a need however, to simplify the algorithmic approach presently used to anticipate rotor demand on the engine and reduce the number of inputs required to predict the demand.

SUMMARY OF THE INVENTION

The subject invention is directed to a new and useful system and method for anticipating rotor torque demand on an engine for use in conjunction with a Full Authority Digital Engine Control (FADEC) to aid in rotor speed control. In one embodiment of the subject invention, there is provided a method of feed-forward anticipation of rotor torque demand on a helicopter engine which includes the steps of predicting the total (aerodynamic+static) torque required at the main and tail rotors of a helicopter, computing the rate of change of the total torque required at the main and tail rotors of the helicopter, establishing a rate of change of gas generator speed corresponding to the rate of change of total torque at the main and tail rotors of the helicopter, and obtaining a demanded rate of change of gas generator speed needed to deliver the required total torque to the main and tail rotors of the helicopter. The method further includes the step of summing the demanded rate of change of engine speed with the output from a power turbine governor to provide an input to an engine speed controller to manage fuel flow to the helicopter engine.

Preferably, the step of predicting total torque required at the main and tail rotors of the helicopter is handled by the helicopter flight control computer, and the method further includes the step of transmitting the predicted total torque at the main and tail rotors of the helicopter from the helicopter flight control computer to an engine fuel control system in real time. In accordance with a preferred embodiment of the subject invention, the step of predicting the total torque required at the main and tail rotors of the helicopter includes the step of summing the aerodynamic torque at the main and tail rotors with the helicopter in motion, the torque at the main rotor with the helicopter stationary, and the torque at the tail rotor with the helicopter stationary.

The step of establishing a rate of change of gas generator speed corresponding to the rate of change of total torque at the main and tail rotors of the helicopter includes the step of applying a conversion factor to the rate of change of total torque based upon gas generator speed. The step of obtaining a demanded rate of change of gas generator speed needed to deliver the required total torque to the main and tail rotors of the helicopter includes the step of passing the rate of change of gas generator speed through a deadband to de-couple the feed-forward anticipation from normal engine control logic.

The subject invention is also directed to a method of feed-forward anticipation of rotor torque demand on a helicopter engine that includes the steps of predicting the total torque required at the main and tail rotors of the helicopter in the helicopter flight control computer, transmitting the predicted total torque at the main and tail rotors of the helicopter from the helicopter flight control computer to an engine fuel control system, computing the rate of change of the total torque required at the main and tail rotors of the helicopter, converting the rate of change of the total torque required at the main and tail rotors of the helicopter to engine acceleration/deceleration rate, and passing the engine acceleration/deceleration rate through a deadband to obtain a demanded engine acceleration/deceleration rate. The method further includes the step of summing the demanded engine acceleration/deceleration rate with the output from a power turbine governor to provide an input to an engine speed controller to manage fuel flow to the helicopter engine.

The subject invention is also directed to a system for performing feed-forward anticipation of rotor torque demand on a-helicopter engine that includes a flight control computer adapted and configured to predict the total torque required at the main and tail rotors of the helicopter, and an engine fuel control system adapted and configured to compute the rate of change of the total torque, convert the rate of change of the total torque to an engine acceleration/deceleration rate, and obtain a demanded engine acceleration/deceleration rate therefrom. The system further includes means for transmitting the predicted total torque at the main and tail rotors of the helicopter from the helicopter flight control computer to the engine fuel control system in real time. preferably, the engine control system coverts the rate of change of the total torque to an engine acceleration/deceleration rate by applying a conversion factor to thereto based upon gas generator speed, and the engine control system is adapted and configured to obtain the demanded engine acceleration/deceleration rate using a deadband to de-couple the feed-forward anticipation from normal engine control logic.

These and other aspects of the system and method of the subject invention will become more readily apparent to those having ordinary skill in the art from the following detailed description of the invention taken in conjunction with the drawings described herein below.

BRIEF DESCRIPTION OF THE DRAWINGS

So that those having ordinary skill in the art to which the subject invention appertains will more readily understand how to make and use the same, reference may be had to the drawings wherein:

FIG. 1 (includes FIGS. 1A and 1B) is a functional block diagram of a rotor torque anticipator configured in accordance with a preferred embodiment of the subject invention which is associated with the aircraft flight control computer and the engine fuel control system;

DETAILED DESCRIPTION OF THE PREFFERED EMBODIMENTS

Figure 1A:
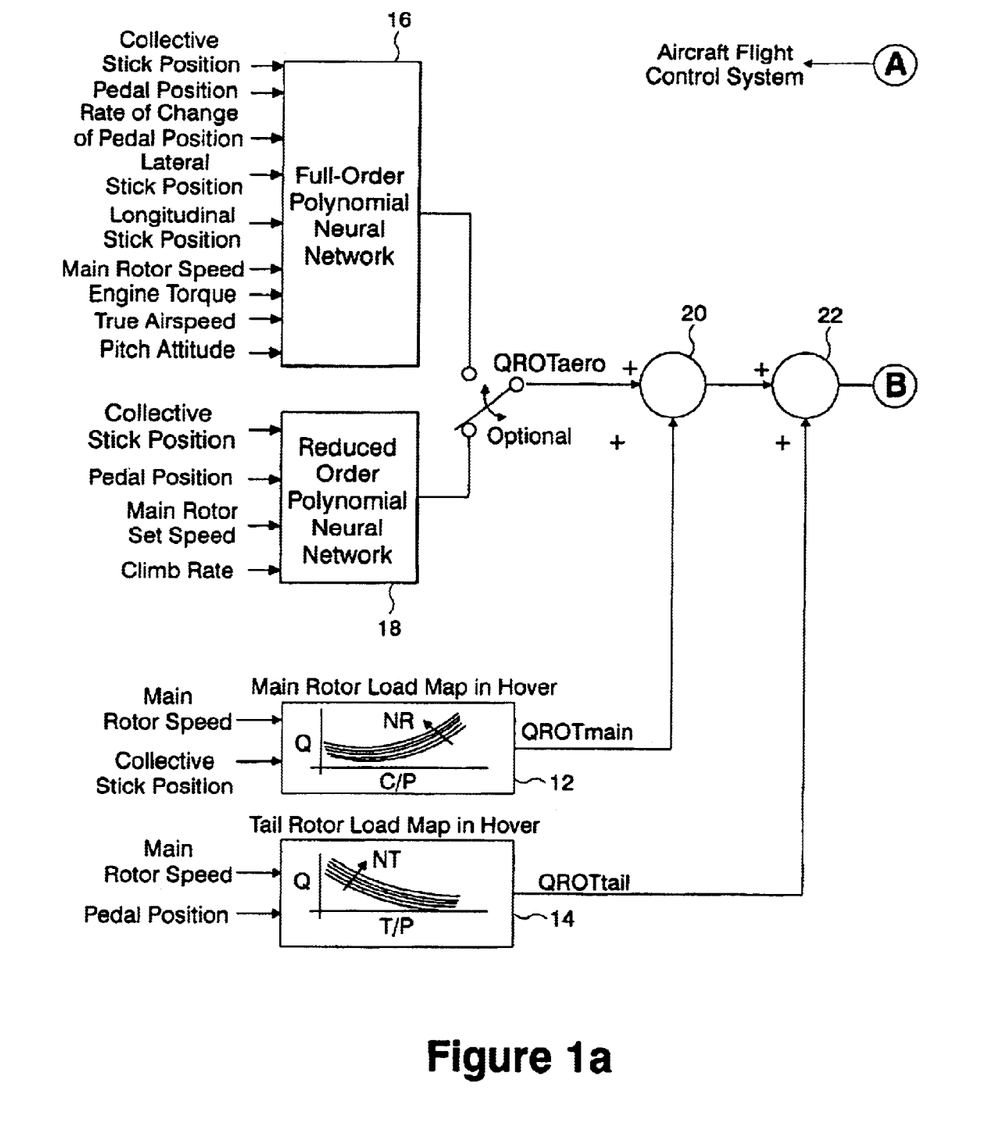
Figure 1B:
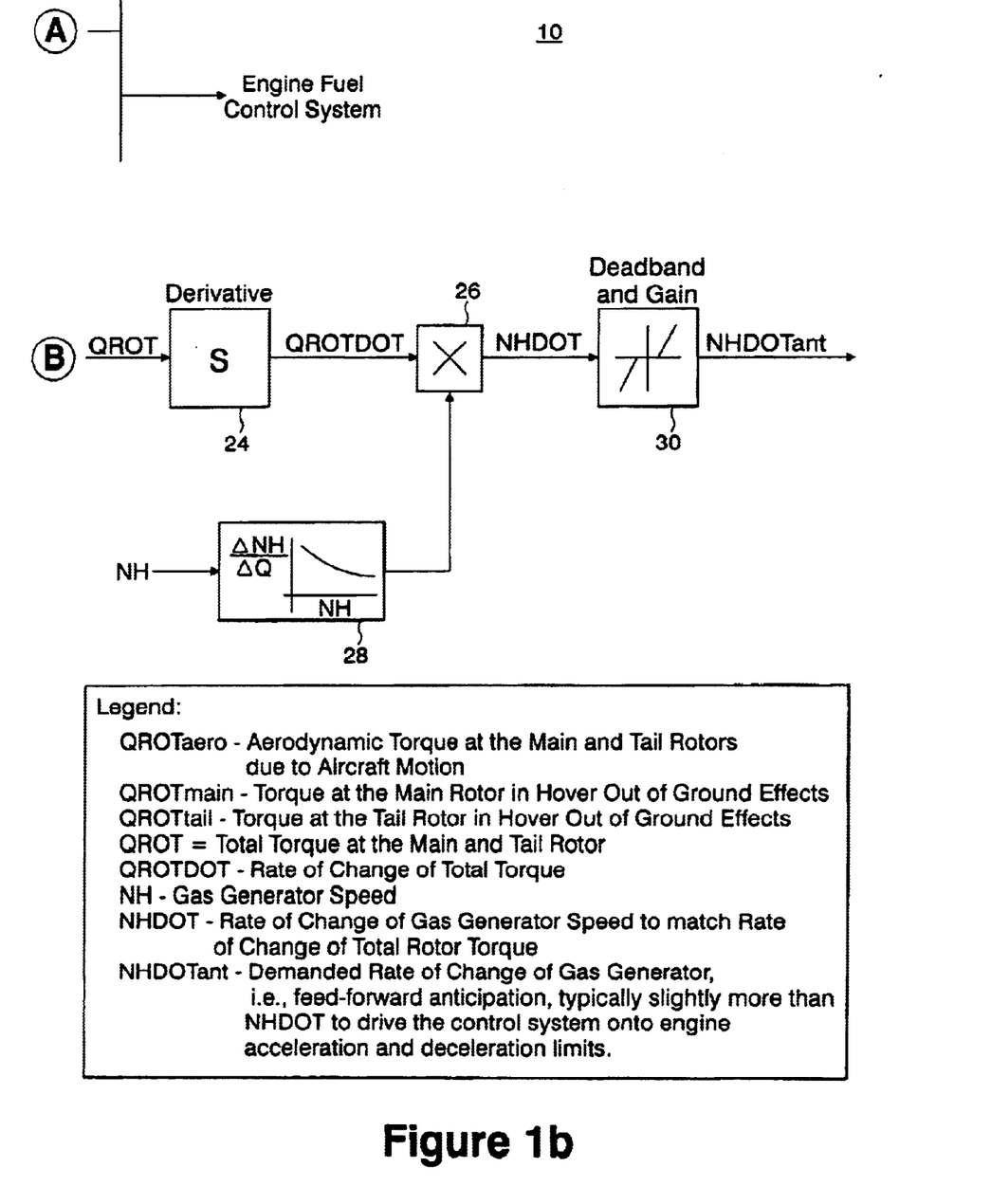

Referring now to the drawings wherein like reference numerals identify similar aspects of the system disclosed herein, there is illustrated in FIG. 1 a schematic representation of a feed-forward rotor torque anticipator configured in accordance with a preferred embodiment of the subject invention and designated generally by reference numeral 10. In general, rotor toque anticipator 10 is adapted and configured to predict the demanded rate of change of the gas generator speed based upon the total (aerodynamic+static) load torque at the rotor blades, so as to minimize transient rotor speed droop and/or overshoot as a result of sudden torque inputs imposed at the rotor blade by abrupt aircraft maneuvers that demand large and/or rapid power excursions. This anticipation logic is configured to bypass the rotor/power turbine speed governor and accelerates/decelerates the engine as required without waiting for rotor/power turbine speed errors to build-up.

In accordance with the subject invention, the total load torque at the main and tail rotor blades of the helicopter is determined by the aircraft flight control system and is composed of three parts. These include: (1) the torque at the main rotor blades with the aircraft stationary, QROTmain; (2) the torque at the tail rotor blades with the aircraft stationary, QROTtail; and (3) the additional (transient) torque at the main and tail rotor blades with the aircraft in motion, QROTaero. These three components are the most instantaneous estimates of load torque, because they exist at the rotor blades. Torque measurements in the shaft of the rotor/drive train between the engine and the rotors is delayed in time by the inertia of the rotor blades. In other words, engine output shaft torque transiently lags the torque at the main and tail rotor blades, and therefore is not suitable for use as a load anticipator. The total instantaneous torque at the rotor blades, QROT, is therefore the best signal to be used as a load anticipator, because it provides the greatest lead to the engine control system The static main rotor torque and the static tail rotor torque are well known because they can be readily measured by the engine shaft torque sensor when the aircraft in hover. Therefore, these measurements can be directly programmed into the flight control computer of the aircraft as a function of rotor speed and blade pitch. Accordingly, the flight control computer stores data representing two engine performance load maps for generating torque values based upon specific pilot and airframe input signals. One load map is the Main Rotor Load Map in Hover 12 and the other load map is Tail Rotor Load Map in Hover 14. These maps may also be referred to Hover Out of Ground Effect (HOGE) load maps. The main rotor load map 12 generates QROTmain using two input signals, namely, the main rotor speed input signal from the airframe and the collective stick position input from the pilot. The tail rotor load map 14 generates QROTtail using the main rotor speed input from the airframe and the pedal position input from the pilot.

The aerodynamic (transient) component of the instantaneous rotor torque is more complex than the static components of the instantaneous rotor torque. Therefore, in accordance with a preferred embodiment of the subject invention, it is computed by a polynomial neural network (PNN) using a larger set of sensed input signal from the airframe and pilot. The neural network can be likened to a high-dimensional lookup table. Once is has been created and "trained" the network never changes. It is programmed into the flight control computer of the aircraft in a fixed or "trained" state. Therefore, for a given set of inputs, the output is deterministic and repeatable.

A polynomial neural network is type of algorithm, and more particularly a self-organizing multi-layered iterative algorithm that can automatically model both linear and non-linear relationships, and yields a polynomial regression equation that is easily interpreted. A PNN algorithm provides robust results in the presence of correlative and irrelative variables or outliers, provides fast learning and numerical stability. PNN algorithms are useful to analyze complex data sets with the aim to determine internal data relationships and to present knowledge about these relationships in the form of a mathematical description.

Referring once again to FIG. 1, the rotor torque anticipator 10 of the subject invention includes two different forms of a polynomial neural network, which may be selectively engaged through an option switch, depending upon the number of candidate inputs. These networks give a more accurate estimate of the required acceleration/deceleration rate than conventional anticipators because in addition to pilot stick inputs and rotor speed, aircraft body states are taken into account. One network is a Full-Order PNN, also known as a High-Order PNN, the other is a Reduced-Order PNN. A High or Full Order PNN has the advantage of having more information to provide a more accurate prediction of transient torque requirements. A Reduced-Order PNN requires fewer measured parameters, and is therefore less accurate at predicting transient torque requirements, but nonetheless such an algorithm is suitable to provide useful and reliable results in conjunction with the subject invention.

The Full-Order PNN 16 receives five (5) pilot inputs including collective stick position data, pedal position data, rate of change of pedal position data, lateral stick position data and longitudinal stick position data, as well as four (4) airframe inputs including main rotor speed data, engine torque data, true airspeed data, and pitch attitude data. This data enables the Full-Order PNN 16 to produce the aerodynamic component of the rotor torque QROTaero. In contrast, the Reduced-Order PNN 18 receives three conventional load anticipation inputs including the main rotor set speed, and the collective stick and pedal position data from the pilot, along with the aircraft climb rate. This data enables the Reduced-Order PNN 18 to produce the aerodynamic component of the rotor torque QROTaero.

In accordance with the subject invention, the two neural networks 16, 18 were trained using the set of maneuvers set forth in Table 1.0. The maneuvers were selected based upon experience with flight testing to size conventional load anticipators.

TABLE 1.0

| Condition | Weight (lbs) | Atmosphere | Comment |
|---|---|---|---|
| 2 sec. Collective Pull | 16825 | SL/STD | Low Gain Pilot |
| 4 sec. Collective Pull | 16825 | SL/STD | Low Gain Pilot |
| 8 sec. Collective Pull | 16825 | SL/STD | Low Gain Pilot |
| 1 sec. Collective Pull | 16825 | SL/STD | High Gain Pilot |
| 4 sec. Collective Pull | 16825 | SL/STD | High Gain Pilot |
| 8 sec. Collective Pull | 16825 | SL/STD | High Gain Pilot |
| 1 sec. Collective Pull | 24500 | SL/STD | High Gain Pilot |
| 2 sec. Collective Pull | 24500 | SL/STD | High Gain Pilot |
| 8 sec. Collective Pull | 24500 | SL/STD | High Gain Pilot |
| 101%/100% split - 1 Sec Collective Pull | 16825 | SL/STD | High Gain Pilot |
| 101%/100% split - 4 Sec Collective Pull | 16825 | SL/STD | High Gain Pilot |
| 101%/100% split - 8 Sec Collective Pull | 16825 | SL/STD | High Gain Pilot |
| 101%/100% split - 1 Sec Collective Pull | 16825 | SL/STD | Low Gain Pilot |
| 101%/100% split - 2 Sec Collective Pull | 16825 | SL/STD | Low Gain Pilot |
| 101%/100% split - 8 Sec Collective Pull | 16825 | SL/STD | Low Gain Pilot |
| 110%/100% split - 2 Sec Collective Pull | 24500 | SL/STD | High Gain Pilot |
| 110%/100% split - 4 Sec Collective Pull | 24500 | SL/STD | High Gain Pilot |
| 110%/100% split - 8 Sec Collective Pull | 24500 | SL/STD | High Gain Pilot |
| Rapid Hover Turn Right | 16825 | SL/STD | High Gain Pilot |
| Rapid Hover Turn Left | 16825 | SL/STD | High Gain Pilot |
| High Aggression Roll Reversal | 16825 | SL/STD | 120 kt, 60 deg Roll Right & Left |
| High Aggression Roll Reversal | 16825 | SL/STD | 120 kt, 60 deg Roll Left & Right |
| Quick Stop to De-Couple Rotor | 16825 | SL/STD | 120 kt Quick Stop & Pushover |
| Quick Stop to De-Couple Rotor | 16825 | SL/STD | 80 kt Quick Stop (aggressive) |
| 120 kt Terrain Avoidance (aggressive) | 16825 | SL/STD | Pull to 2.0 "g", Pushover to 0 "g" |
| 120 kt Terrain Avoidance (moderate) | 16825 | SL/STD | Pushover to 0 "g", Pull to 2.0 "g" |

The Full-Order PNN 16 was designed to predict the aerodynamic component of torque QROTaero in all of the training maneuvers with equal weight placed on each of the maneuvers. That is, the Full-Order PNN 16 is designed to predict aerodynamic torque for collective pitch and non-collective pitch maneuvers. In contrast, the Reduced-Order PNN 18 concentrates primarily on large power transients initiated with collective pitch. The structure of the Reduced-Order PNN 18 is illustrated in FIG. 2.

Figure 2:
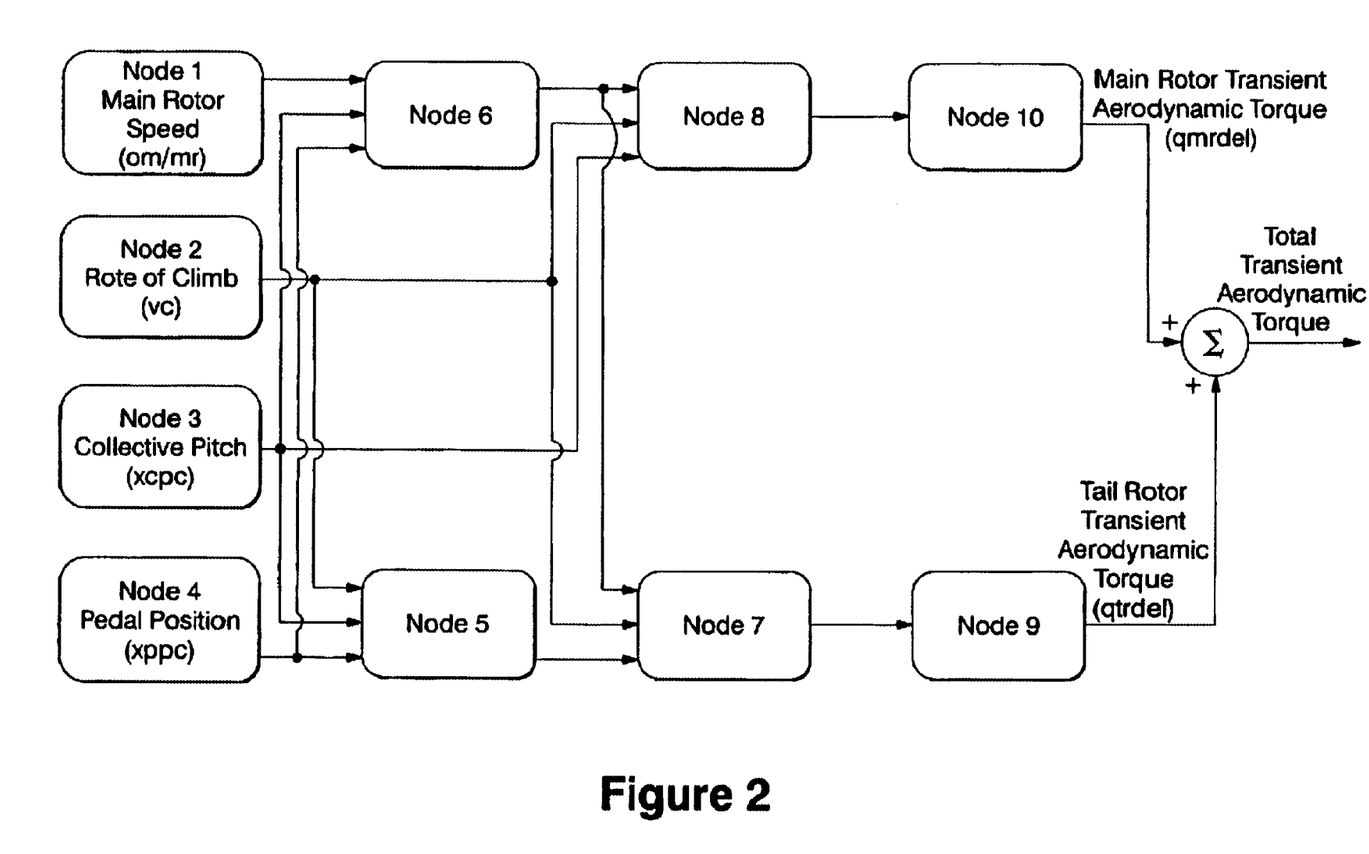
FIG. 2 is a schematic representation of a reduced order polynomial network configured in accordance with a preferred embodiment of the subject invention having ten (10) interconnected nodes each having a quadratic polynomial associated therewith.

Referring to FIG. 2, the Reduced-Order PNN 18 has ten (10) interconnected nodes, with quadratic polynomials stored at each node. These polynomials are set forth hereinbelow. The coefficients of the polynomials are determined during the training phase, wherein numerical optimization techniques are used to curve fit the output of the PNN to test data for each of the training maneuvers. The objective of the training is to minimize the error between the predicted torque and the actual torque versus the time for the combined set of maneuvers. Therefore, there is no single maneuver that is perfectly matched by the PNN. Instead, the best fit for all maneuvers is obtained.

Node1=−47.9016+47.7217*$omrm$; where $omrm$ is the Main Rotor Speed Ratio (=1 for 100%)

Node2=−0.108098+0.000515121*$vc$; where $vc$ is the Rate of Climb (Fpm)

Node3=−2.40326+0.0434588*$xcpc$; where $xcpc$ is the Collective Stick Position (%)

Node4=−3.5805+0.0678252*$xppc$; where $xppc$ is the Pedal Position (%)

$Node5 = 0.0700913 + 0.162856 * Node2 - 0.0479842 * Node2^2 +$
$\quad 0.0301905 * Node3 + 0.120207 * Node2 * Node3 -$
$\quad 0.493 * Node3^2 - 0.074163 * Node4 -$
$\quad 0.589806 * Node2 * Node4 +$
$\quad 0.66802 * Node3 * Node4 + 0.100489 * Node4^2.$ $Node6 = -0.154826 - 0783796 * Node1 + 0.143501 * Node1^2 +$
$\quad 1.41595 * Node3 + 0.380806 * Node1 * Node3 -$
$\quad 0.350551 * Node3^2 - 0.253151 * Node4 +$
$\quad 0.286963 * Node1 * Node4 -$
$\quad 0.216568 * Node3 * Node4 - 0.0285866 * Node4^2$ $Node7 = 0.381176 + 0.318371 * Node5 - 0.316399 * Node5^2 -$
$\quad 0.462027 * Node6 + 0.402343 * Node5 * Node6 -$
$\quad 0.156152 * Node6^2 - 0.0101178 * Node2 -$
$\quad 0.0387345 * Node5 * Node2 +$
$\quad 0.00356685 * Node6 * Node2 - 0.0670383 * Node2^2$ $Node8 = 0.0937645 + 1.13228 * Node6 - 0.0208753 * Node2 +$
$\quad 0.269972 * Node6 * Node2 + 0.0331041 * Node2^2 -$
$\quad 1.10191 Node3 + 0.19895 * Node6 * Node3 -$
$\quad 0.964847 * Node2 * Node3 + 0.174026 * Node3^2$ Node9=−48.9181+79.32*Node7

Node10=−4227.53+8130.15*Node8

The Full-Order PNN 16 is an order of magnitude more complicated than the Reduced-Order PNN 18 because it tries to match collective as well as non-collective maneuvers with equal weighting. Consequently, nine (9) inputs and forty-nine (49) nodes are required in the Full-Order PNN 16.

Depending upon which neural network is selected, the torque anticipator 10 of the subject invention will sum the QROTaero value from the selected PNN with the QROTmain value generated by the Main Rotor Load Map in Hover at summing junction 20, and this value will be summed with the QROTtail value generated by the Tail Rotor Load Map in Hover at summing junction summing junction 22, resulting in the total instantaneous torque at the rotor blades, QROT. This torque value is representative of the pilot stick inputs, as well as aircraft body states (e.g., airspeed, pitch attitude, roll rate, yaw rate and climb/descent rate), and is used by the engine fuel control system to aid in rotor speed control of the helicopter by delivering an appropriate amount of fuel to the engine to accelerate or decelerate the engine.

Referring again to FIG. 1, the total torque value QROT is forwarded to the engine control system from the aircraft flight control system in real-time. Initially, the QROT value may be divided in half if the helicopter has two engines. Then, the derivative of QROT is obtained using a differentiator or derivative circuit 24. The resultant is the value rate of change of the total torque QROTDOT (%/sec). This value is conditioned by an amplifier circuit 26 using a conversion factor derived from the gas generator speed. More particularly, an engine performance map 28 is provided which generates a conversion factor based upon the change of gas generator speed NH versus the change is engine shaft torque Q. The conversion factor is applied to QROTDOT to obtain the rate of change of the gas generator speed NHDOT that corresponds to the rate of change of the total rotor torque QROTDOT, or in other words, the engine acceleration/deceleration rate.

For small values of NHDOT that can be easily handled by a closed loop rotor/power turbine speed governor, the feed forward anticipation logic of the subject invention is not required. Therefore, the value NHDOT is passed through a small deadband 30 to de-couple the load anticipator from the normal engine control logic/laws. This precludes the feedforward load anticipation of the subject invention from degrading the stability margins of the rotor/power turbine speed control loop.

By way of example, deadband 30 may be designed to react to signals or values of NHDOT that exceed ±2%/sec. Thus, only steep changes in the rate of change of NHDOT will activate the torque anticipator 10 of the subject invention. The anticipation logic will not react to changes in the rate of change of NHDOT within the predefined deadband range ±2%/sec. Those skilled in the art will readily appreciate that the deadband can be modified to react to a broader or narrower range of signals or values to accommodate differing operating parameters.

Signals of NHDOT that pass through deadband 30, i.e., those signals or values of NHDOT that fall outside of the deadband range ±2%/sec, represent the demanded rate of change of the gas generator speed NHDOTant. This is the feed-forward anticipation, typically slightly more than NHDOT, to drive the control system onto engine acceleration and deceleration limits. This value is summed with the output of the power turbine governor (PTG) to provide an input to an engine speed controller.

The engine speed controller manages fuel flow (WF) to the helicopter engine(s) to accelerate or decelerate the helicopter engine(s) in an effort to minimize transient rotor speed droop and overshoot resulting from sudden torque inputs at the rotor blades when the aircraft is maneuvering. At this time, all other anticipators, i.e., collective pitch, rotor speed decay, tail rotor pitch and lateral cyclic anticipators are disabled. Therefore, the only active anticipator is the subject rotor torque anticipator 10. In sum, the subject invention simplifies the engine control system logic by utilizing a single input from the flight control system, namely, the total torque QROT, thus eliminating numerous conventional pilot and airframe inputs.

Figure 3:
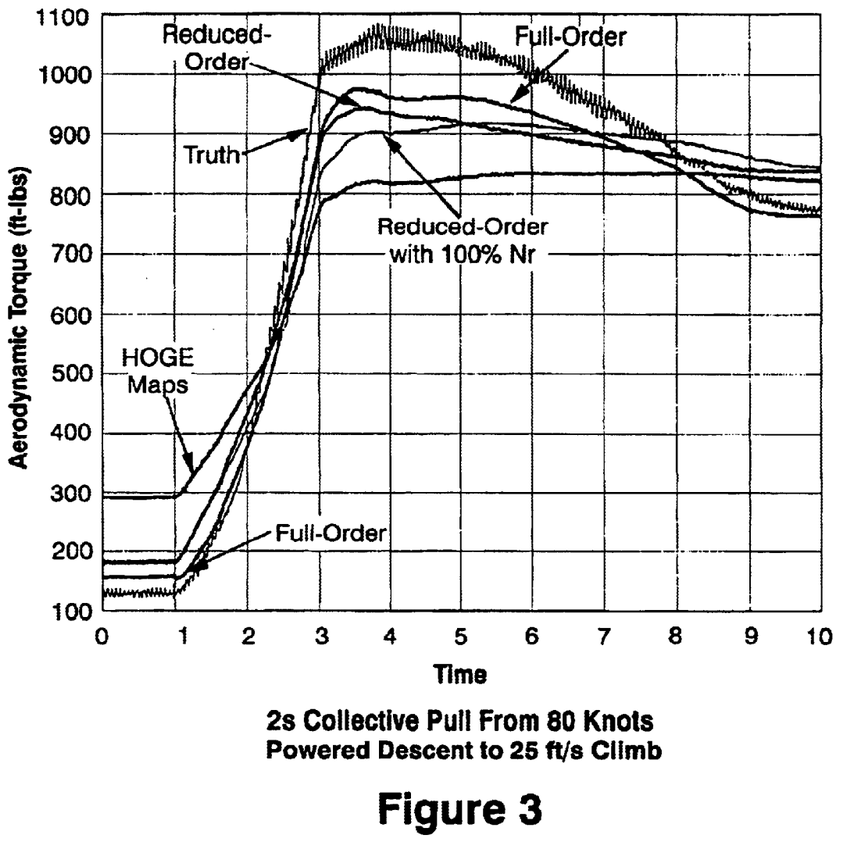
FIG. 3 is a graphical representation of comparative rotor torque predictions resulting from a simulated pull-up from a powered decent.
Figure 4:
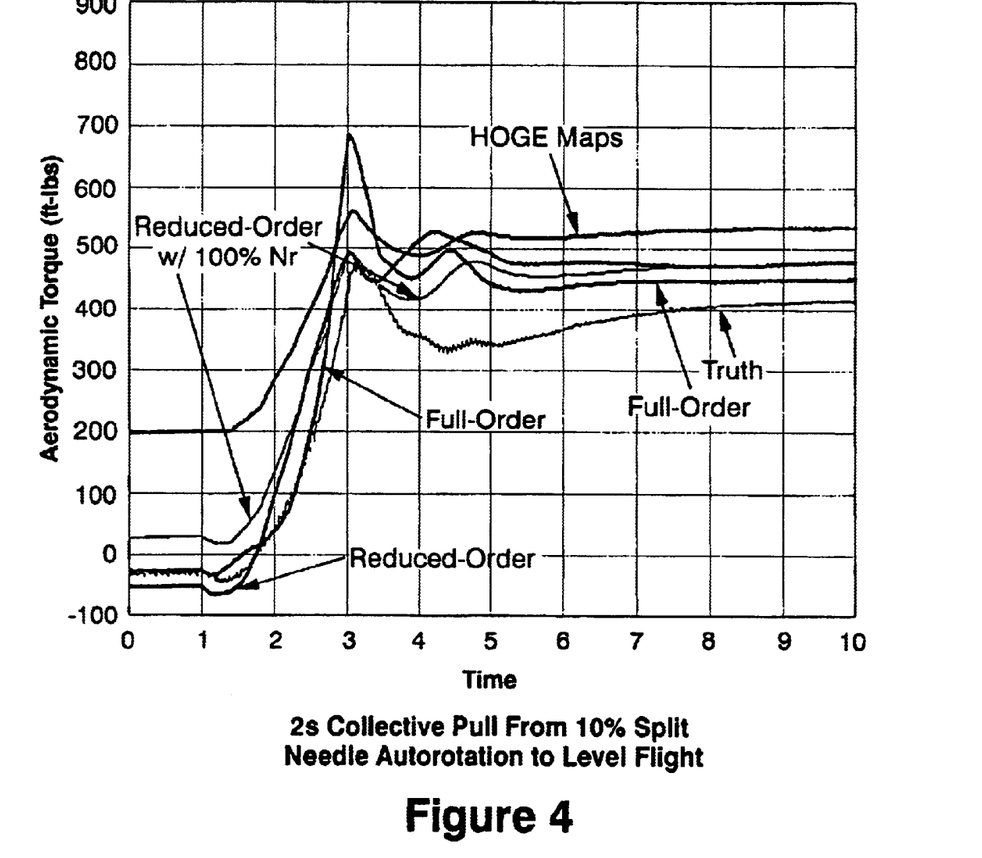
FIG. 4 is a graphical representation of comparative rotor torque predictions resulting from a simulated autorotation recovery to level flight.
Figure 5:
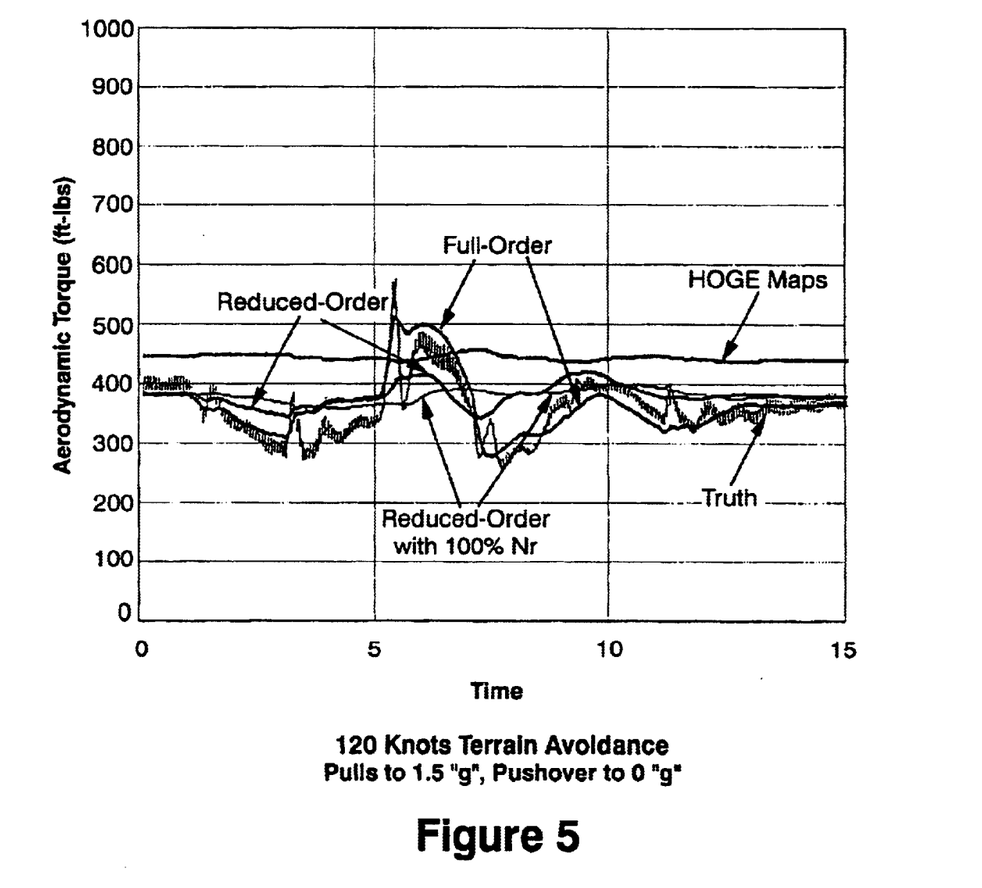
FIG. 5 is a graphical representation of comparative rotor torque predictions resulting from a simulated high speed terrain avoidance maneuver.

Referring to FIGS. 3 through 5, the performance of the neural networks 16, 18 in predicting demanded rotor torque was investigated using three representative helicopter maneuvers that demand large and/or rapid engine power excursions. In each case, the results of the simulation provided a comparison between the following: (a) the true torque demanded during the maneuver; (b) the predicted torque demanded using a full-order polynomial neural network; (c) the predicted torque demanded using a reduced order polynomial neural network; (d) the predicted torque demanded using a reduced order polynomial neural network with 100% NR; and (e) the predicted torque demanded using the steady state Hover Out of Ground Effect (HOGE) Maps for the main and tail rotors.

Referring to FIG. 3, there is illustrated the plotted results from a simulated recovery from a low-power, rotor coupled decent to a steep climb. The maneuver involved a 2 g collective pull from an 80 knot powered decent to a 25 ft/s climb. In this case, the plotted results show that the Full-Order PNN provides the most accurate prediction of the true torque, as compared to either of the Reduced-Order PNN's. The Reduced-Order PNN's both estimate a somewhat smaller rate of change or torque (about 30% less) than the actual or true torque in the 2–3 seconds time frame. In contrast, the output of the steady state HOGE maps differs substantially from the true demanded torque. This is because transient effects are not taken into account.

Referring to FIG. 4, there is illustrated the plotted results from a simulated auto-rotation recovery into level flight. The maneuver involved a 2 s collective pull from 10% split needle auto-rotation to level flight. In this case, the static main and tail rotor torque HOGE maps account for only 55% of the change in rotor torque during this maneuver. Therefore, the aerodynamic component of the total torque due to aircraft motion, which is estimated by the PNN, is quite important. A comparison of the two PNN's shows that the Full-Order PNN overshoots the final torque by a considerable amount in the 2.5 to 3.5 second time frame, whereas the Reduced-Order PNN gives a closer match. This is due to the fact that the Full-Order PNN was trained over a wider range of maneuvers, whereas the Reduced-Order PNN was trained primarily on collective maneuvers.

The Reduced-Order PNN with a constant set speed of 100% NR also does a good job in predicting the true torque. In this case, this configuration is preferable because it effectively de-couples the feed-forward load anticipation from the primary engine control. The bias errors between the predicted torque and the actual or true torque, beyond the 3.5 second mark, are insignificant because the rate of change of torque is small. It should be noted that the load anticipation logic of FIG. 1 takes the derivative of predicted torque to get the engine going which is more important at the start of the maneuver where the rate of change is large. The power turbine governor handles the rest of the maneuver to smoothly control the rotor/power turbine speed.

Referring to FIG. 5, there is illustrated the plotted results from a high speed terrain avoidance maneuver. In particular, the maneuver involved a 120 knot terrain avoidance pull to 1.5 g, pushover to 0 g. This maneuver uses considerable longitudinal cyclic pitch manipulation, and therefore, it is expected that the Full-Order PNN would provide the most accurate prediction of the true torque. In this instance, the static HOGE maps have little effect on the outcome. The Reduced-Order PNN's do not provide an accurate prediction of torque in this case, because the longitudinal cyclic data is not an input into the Reduced-Order PNN's. Such a shortfall can be accommodated by a responsive power turbine governor. The Full-Order PNN provides an accurate prediction of the true torque because it has the necessary input signals and is trained on similar maneuvers.

Although the systems and methods of the subject invention has been described with respect to preferred embodiments, those skilled in the art will readily appreciate that changes and modifications may be made thereto without departing from the spirit and scope of the present invention as defined by the appended claims.

What is claimed is:

1. A method of feed-forward anticipation of rotor torque demand on a helicopter engine comprising the steps of:
   a) predicting the total torque required at the main and tail rotors of a helicopter, wherein the total torque includes the aerodynamic torque and the static torque at the main and tail rotors;
   b) computing the rate of change of the total torque required at the main and tail rotors of the helicopter;
   c) establishing a rate of change of gas generator speed corresponding to the rate of change of total torque at the main and tail rotors of the helicopter; and
   d) obtaining a demanded rate of change of gas generator speed needed to deliver the required total torque to the main and tail rotors of the helicopter.

2. A method according to claim 1, wherein the step of predicting total torque required at the main and tail rotors of the helicopter is handled by the helicopter flight control computer.

3. A method according to claim 1, further comprising the step of transmitting the predicted total torque at the main and tail rotors of the helicopter from the helicopter flight control computer to an engine fuel control system in real time.

4. A method according to claim 1, wherein the step of predicting the total torque required at the main and tail rotors of the helicopter includes the step of summing the aerodynamic torque at the main and tail rotors with the helicopter in motion, the torque at the main rotor with the helicopter stationary, and the torque at the tail rotor with the helicopter stationary.

5. A method according to claim 1, wherein the step of establishing a rate of change of gas generator speed corresponding to the rate of change of total torque at the main and tail rotors of the helicopter includes the step of applying a conversion factor to the rate of change of total torque based upon gas generator speed.

6. A method according to claim 1, wherein the step of obtaining a demanded rate of change of gas generator speed needed to deliver the required total torque to the main and tail rotors of the helicopter includes the step of passing the rate of change of gas generator speed through a deadband to de-couple the feed-forward anticipation from normal engine control logic.

7. A system as recited in claim 1, further comprising the step of summing the demanded rate of change of engine speed with the output from a power turbine governor to provide an input to an engine speed controller to manage fuel flow to the helicopter engine.

8. A method of feed-forward anticipation of rotor torque demand on a helicopter engine comprising the steps of:
   a) predicting the total torque required at the main and tail rotors of the helicopter in the helicopter flight control computer, wherein the total torque includes the aerodynamic torque and the static torque at the main and tail rotors;
   b) transmitting the predicted total torque at the main and tail rotors of the helicopter from the helicopter flight control computer to an engine fuel control system;
   c) computing the rate of change of the total torque required at the main and tail rotors of the helicopter;
   d) converting the rate of change of the total torque required at the main and tail rotors of the helicopter to engine acceleration/deceleration rate; and
   e) passing the engine acceleration/deceleration rate through a deadband to obtain a demanded engine acceleration/deceleration rate.

9. A method according to claim 8, wherein the step of predicting the total torque required at the main and tail rotors of the helicopter includes the step of summing the aerodynamic torque at the main and tail rotors with the helicopter in motion, the torque at the main rotor with the helicopter stationary, and the torque at the tail rotor with the helicopter stationary.

10. A method according to claim 8, wherein the step of converting the rate of change of the total torque required at the main and tail rotors of the helicopter to engine acceleration/deceleration rate includes the step of applying a conversion factor to the rate of change of total torque based upon gas generator speed.

11. A method according to claim 8, further comprising the step of summing the demanded engine acceleration/deceleration rate with the output from a power turbine governor to provide an input to an engine speed controller to manage fuel flow to the helicopter engine.

12. A system for performing feed-forward anticipation of rotor torque demand on a helicopter engine comprising:
   a) a flight control computer adapted and configured to predict the total torque required at the main and tail rotors of the helicopter, wherein the total torque includes the aerodynamic torque and the static torque at the main and tail rotors; and
   b) an engine fuel control system adapted and configured to compute the rate of change of the total torque, convert the rate of change of the total torque to an engine acceleration/deceleration rate, and obtain a demanded engine acceleration/deceleration rate therefrom.

13. A system as recited in claim 12, further comprising means for transmitting the predicted total torque at the main and tail rotors of the helicopter from the helicopter flight control computer to the engine fuel control system in real time.

14. A system as recited in claim 12, wherein the engine control system converts the rate of change of the total torque to an engine acceleration/deceleration rate by applying a conversion factor to thereto based upon gas generator speed.

15. A system as recited in claim 12, wherein the engine control system is adapted and configured to obtain the demanded engine acceleration/deceleration rate using a deadband to de-couple the feed-forward anticipation from normal engine control laws.

* * * * *